United States Patent [19]

Lemmon

[11] 4,167,262
[45] Sep. 11, 1979

[54] PILOT ACTUATED VALVE
[75] Inventor: John C. Lemmon, Salem, Ohio
[73] Assignee: Hunt Valve Co., Inc., Salem, Ohio
[21] Appl. No.: 731,291
[22] Filed: Oct. 12, 1976
[51] Int. Cl.² .......................................... F16K 31/122
[52] U.S. Cl. ...................................... 251/25; 251/63;
251/282; 251/325; 251/364; 277/188 A;
137/487.5
[58] Field of Search ............... 137/485, 487.5; 251/62,
251/63, 63.5, 25, 282, 325, 324, 359, 364, DIG.
1; 277/188 A

[56] References Cited
U.S. PATENT DOCUMENTS

| | | | |
|---|---|---|---|
| 1,977,565 | 10/1934 | Yarnall | 251/325 |
| 2,619,120 | 11/1952 | Page et al. | 251/63 |
| 2,841,429 | 7/1958 | McCuistion | 251/DIG. 1 |
| 2,996,074 | 8/1961 | Page et al. | 251/282 |
| 3,088,759 | 5/1963 | Corsette | 277/188 A |
| 3,095,176 | 6/1963 | Hunt | 251/62 |
| 3,518,032 | 6/1970 | DeGroff et al. | 251/324 |
| 3,590,848 | 7/1971 | Svensson | 137/625.68 |
| 4,040,636 | 8/1977 | Albertson et al. | 277/188 A |

FOREIGN PATENT DOCUMENTS

| | | | |
|---|---|---|---|
| 267946 | 6/1966 | Australia | 277/188 A |
| 1193987 | 11/1959 | France | 277/188 A |
| 1289558 | 9/1972 | United Kingdom | 277/188 A |

Primary Examiner—William R. Cline
Assistant Examiner—G. L. Walton
Attorney, Agent, or Firm—Michael Williams

[57] ABSTRACT

A valve of simplified construction, adapted to control fluid of high volume and pressure. The valve plunger is a hollow metal tube, that controls fluid flow by moving radial slots in its peripheral wall back and forth across a seal. The plunger is moved by an air or hydraulic cylinder which is connected to the plunger by a plate ring. The plate ring has a series of holes therethrough that allow the line media to flow through, out of and around the plunger to create a balancing effect and thus decrease opposition to movement of the plunger, which opposition may be caused by forces created by the line media. The improved valve utilizes double-acting seals to isolate a down stream port, and to seal off the increase in pressure downstream when the valve is closed.

12 Claims, 5 Drawing Figures

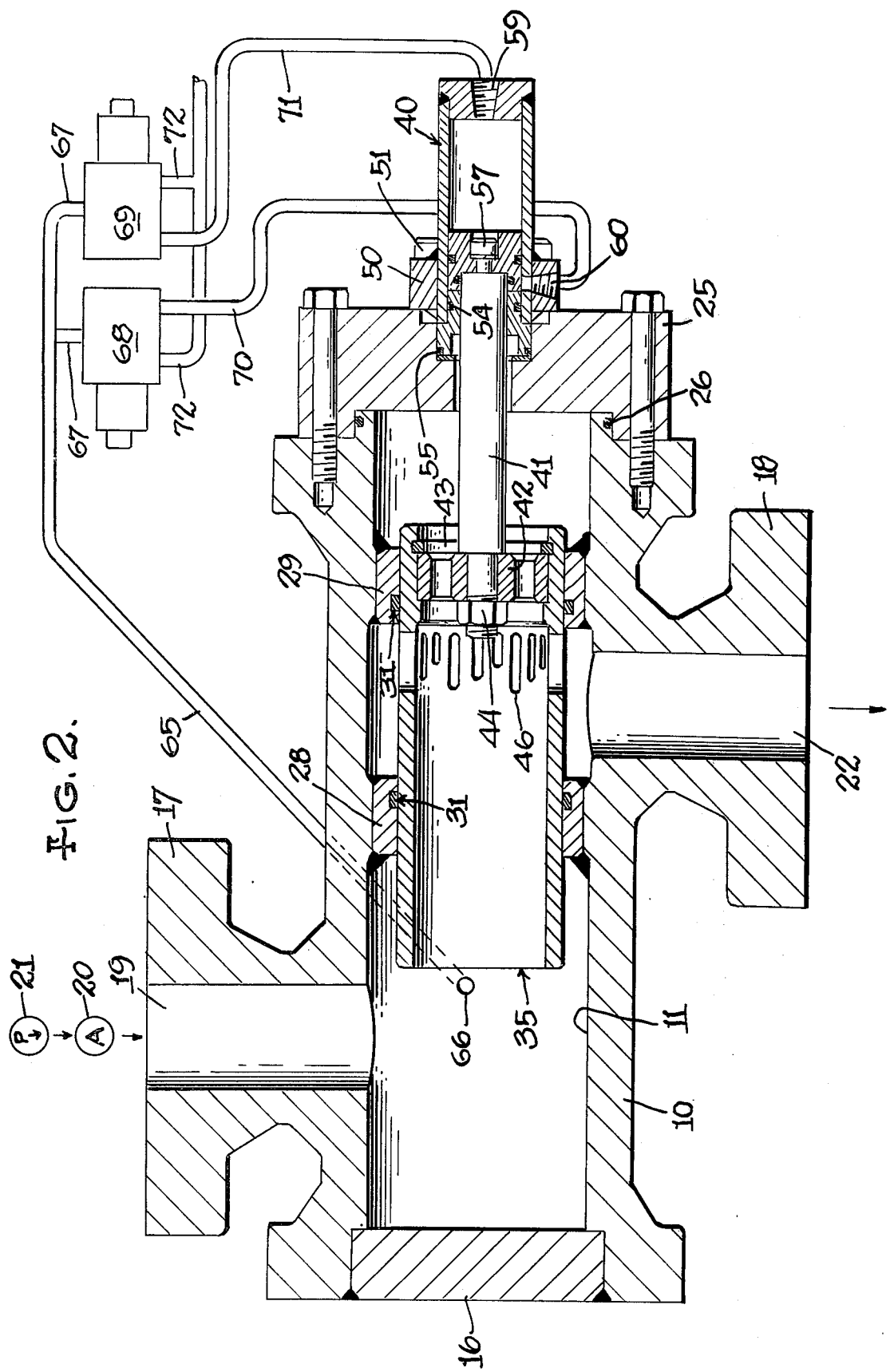

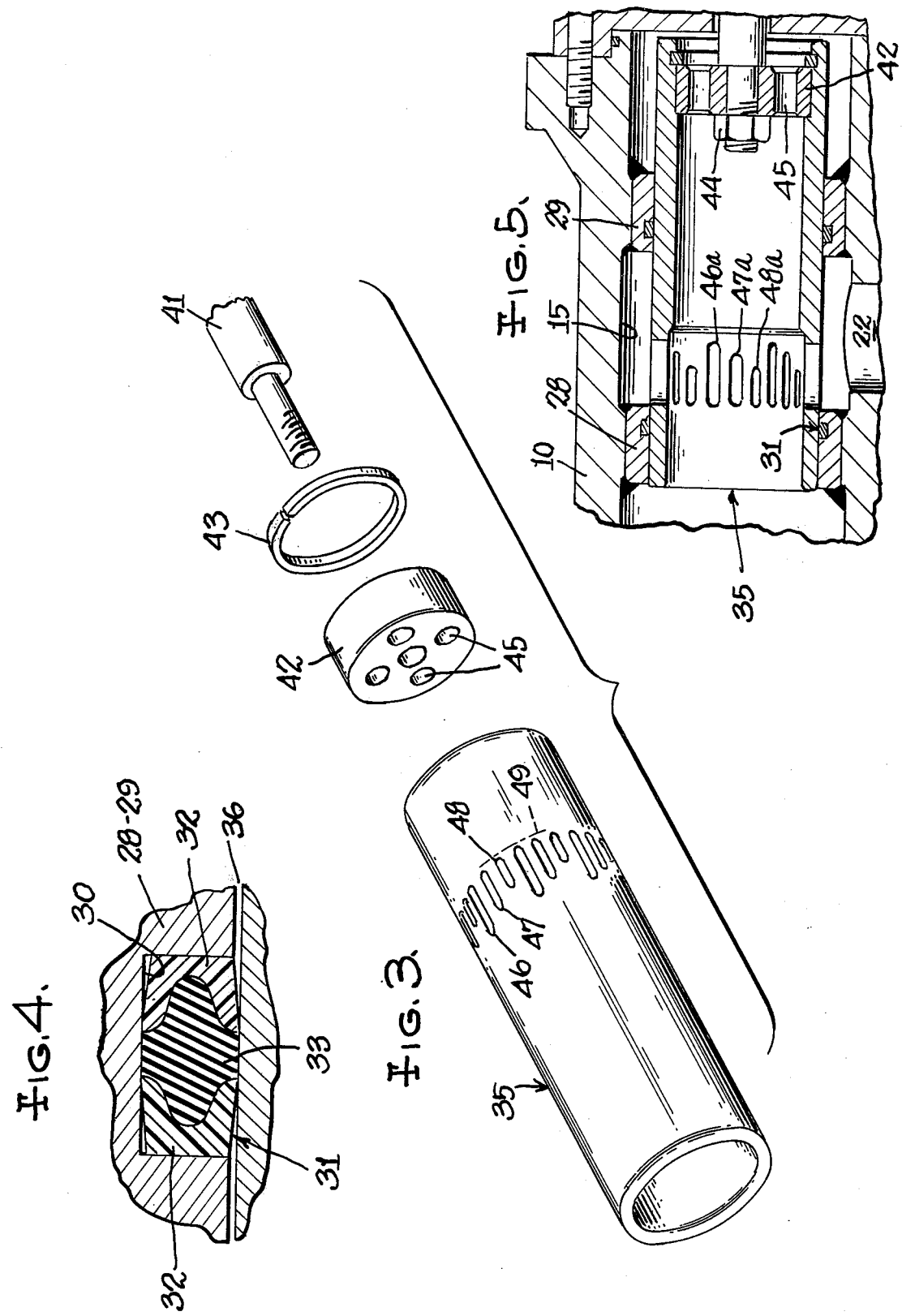

PILOT ACTUATED VALVE

BACKGROUND AND SUMMARY

Valves of the type herein disclosed are adapted to control flow of liquids under pressure, and particularly liquids having a low viscosity. Such valves find considerable use in steel mills, as a main control of high pressure water sprays that de-scale hot steel sheets in rolling mills.

Valves of the prior art included a hollow valve plunger in the form of a tube which is closed at one or both ends. Representative of the prior art is a valve shown in FIG. 8 of U.S. Pat. No. 3,095,176, issued to Nathan C. Hunt, on June 25, 1963.

My improved valve simplifies construction and therefore provides economy in manufacturing without sacificing efficiency in operation. The plunger of this valve is in the form of a metal tube, with one end adapted to receive line pressure and the other end adapted to permit fluid flow therethrough, so that line pressure is in a substantially balanced condition within and about the plunger, whereby the pilot operator does not have to overcome forces created by the line media during shifting of the plunger from one position to the other.

DESCRIPTION OF THE DRAWINGS

In the drawings accompanying this specification and forming a part of this application, there is shown, for purpose of illustration, an embodiment which my invention may assume, and in these drawings:

FIG. 2 is a view similar to FIG. 1, with the valve plunger in its other position, FIG. 3 is a perspective view of parts in separated relation, FIG. 4 is a fragmentary, enlarged view of a double acting seal, and FIG. 5 is a fragmentary longitudinal sectional view, showing a plunger with radial ports in a different location.

DESCRIPTION OF THE PREFERRED EMBODIMENT

Figure 1:
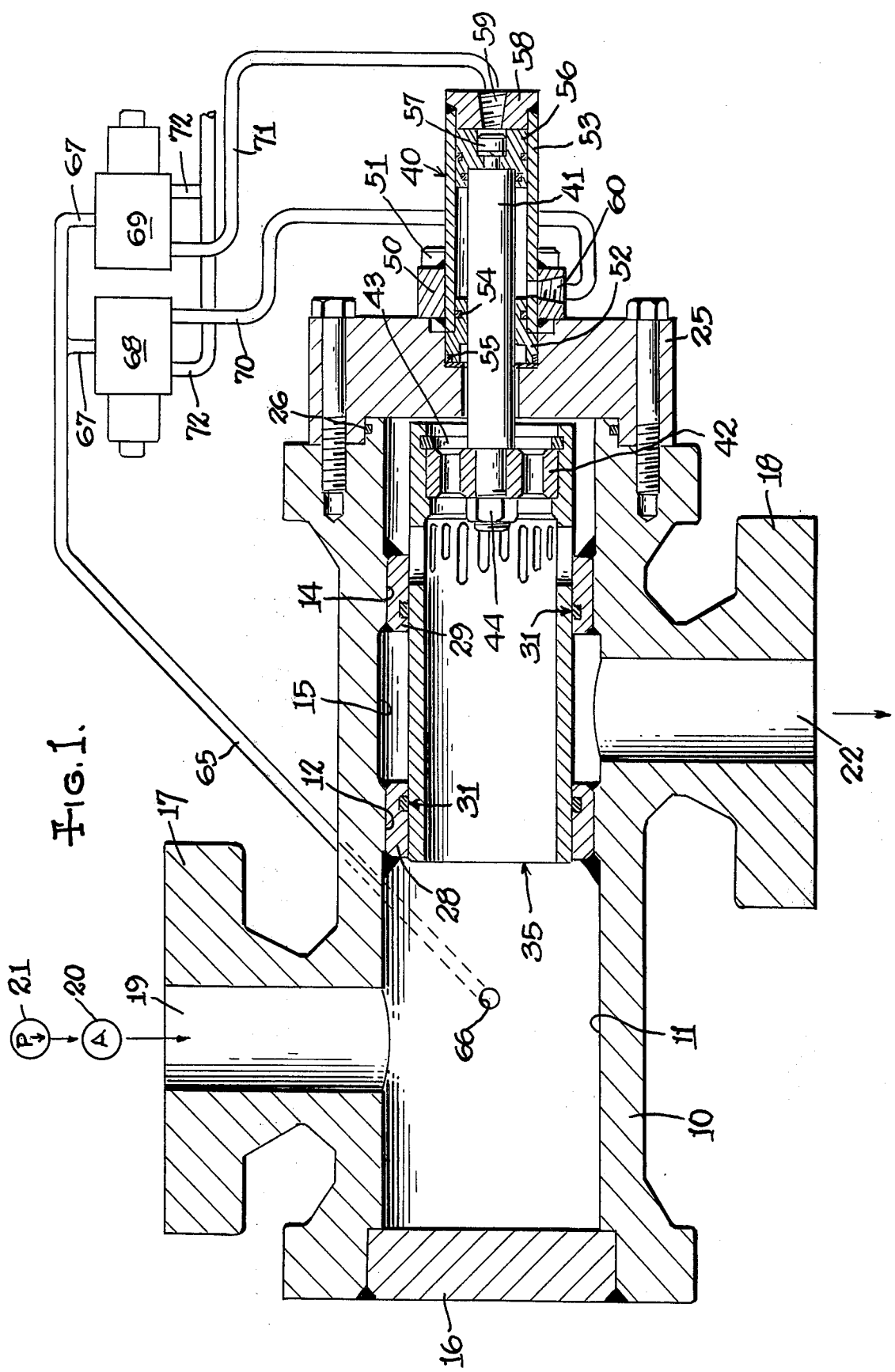
FIG. 1 is a longitudinal sectional view through a valve disclosing my improved construction, and showing the valve plunger in one position.

The embodiment herein disclosed comprises a metal valve body 10 which may be formed as a casting, or part casting and part fabrication. The body has a longitudinal opening 11 therethrough, with a pair of machined annular lands 12 and 14 between an annularly enlarged chamber 15. Only the lands 12 and 14 require machining and the remaining part of the longitudinal opening in the body do not require any finishing operation.

One end (the left end as viewed in FIGS. 1 and 2) of the body opening is closed by a metal disc 16 which may be welded in place as shown, or otherwise secured in place to seal this end opening. Inlet and outlet flanges 17 and 18 are connected to the body 10, preferably in the manner shown in said Hunt patent. The inlet flange has an inlet opening 19 adapted to be connected to a source of liquid under pressure, such as an accumulator 20 and pump 21, both shown diagramatically. The inlet opening communicates with the body opening 11 at the left-hand end of the body. The outlet flange 18 has an outlet opening 22 adapted to be connected to any desired apparatus, such as the high pressure water sprays in rolling mills. The outlet opening 22 communicates with the annular chamber 15 within the valve body. The opposite end (right-hand end seen in FIG. 1) of the body opening is closed by a closure plate 25 which is bolted to the valve body, as shown. An O-ring seal 26 prevents fluid leakage at this connection.

Seal rings 28 and 29 are secured in position on respective lands 12 and 14, preferably as by welding, as shown. Each seal ring is preferably formed of stainless steel and has an external diameter machined to closely fit the diameter of a respective land. Both seal rings are machined after the welding operation to accurately align their inner diameters. Each seal ring has an annular groove 30 (see especially FIG. 4) for the reception of a double acting seal 31. Each of the seals comprises a pair of hard, long wearing synthetic wear rings 32, with a softer seal ring 33 confined therebetween. The wear rings 32 may be formed of a suitable plastic fluro-carbon, such as Teflon, while the seal ring may be made of a softer elastomer, such as Buna N rubber. A suitable seal is sold commercially by Parker Seal Company.

A plunger 35 is mounted for axial reciprocation within the valve body and comprises a metal cylinder, preferably formed of stainless steel, and open at both ends. The external surface of the plunger has a very slight operating clearance with the machined inner diameter of each seal ring 28-29, as shown enlarged in FIG. 4 at 36, so that the actual bearing for the plunger is formed by the Teflon wear rings 32 to provide for free sliding action, with the seal ring 33 sealing against passage of fluid in both directions. Thus, the Teflon wear rings 32 act as bearings to prevent metal-to-metal contact and also act as wipers to keep contaminants away from the softer seal ring 33.

The plunger 35 is shifted axially by an air or hydraulic cylinder and, in the presently disclosed embodiment, the shifting action is accomplished by a hydraulic cylinder 40 which is operated by line media. Piston 41 of the cylinder 40 is connected to the right hand end (as viewed in the drawings) of the plunger 35 by means of a metal plate ring 42 which is held seated against a shoulder on the plunger by means of a lock ring 43. The left hand end of the piston 41 is reduced to pass through a central opening in the plate ring and its extremity is threaded to receive a nut 44. The plate ring 42 has a series of openings 45 therethrough for the passage of pressure fluid.

As seen in FIG. 1, the left hand end of the plunger is entirely open to pressure fluid from the inlet port 19, and this fluid may freely pass through the interior of the plunger and through the openings 45 to the exterior of the plunger to provide a substantially balanced condition. The small area at the left end of the piston and the surface of the plate ring intermediate the openings 45 provide a piston surface to urge the plunger 35 and piston 41 to the right so as to normally occupy the position shown in FIG. 1. For some applications this is desirable since the valve will fail to its closed position in the event pilot pressure is lost.

The plunger 35 is formed with radial ports in the form of slots and, as best seen in FIG. 3, the slots are shown in a repeating pattern with three slots per pattern. Each pattern includes a long slot 46, a shorter slot 47, and a still shorter slot 48. In FIGS. 1 through 3, all slots begin at a common base line, indicated by the dotted line 49 in FIG. 3. The purpose of the different sized slots is to suppress line shock during operation of the plunger.

As shown in FIGS. 1 and 2, the pilot cylinder 40 extends through an opening in a ring block 50 and is preferably secured in position by welding. The block 50 in turn is secured to the rear closure plate 25 by bolts 51. A forward bearing 52 has an enlarged part closely seated in an opening in the closure plate 25 and a reduced part closely fitting within the cylindrical casing 53 of the cylinder 40. The bearing 52 guides the piston 41 in its reciprocal movements. O-rings 54 and 55 prevent leakage of fluid past the forward bearing.

Secured to the rear of the piston 41 is a piston head 56 which is slidable within the cylindrical casing 53 of the cylinder 40. The head is held in place by a central bolt 57 and is provided with suitable O-ring seals, as shown, to prevent fluid leakage. A plug 58 is welded into the rear end of tubular casing 53 and is provided with a central threaded opening 59 to deliver fluid under pressure to the rear of the piston head 56 to drive it and the plunger 35 to the position shown in FIG. 2. The piston head 56 abuts the forward bearing 52 to limit forward movement of the piston and plunger to a predetermined position. The ring block 50 is provided with a threaded opening 60 to deliver fluid under pressure to the front of the piston head 56 to return the piston 41 and plunger 35 to the position shown in FIG. 1.

It will be noted that the cylinder 40 and ring block 50 provide a unitary assembly to facilitate manufacturing operations. To assemble the valve components, the forward end of the piston 41 is inserted through the central opening in the rear closure plate 25 (prior to the time the latter is bolted to the valve body 10) so that the enlarged part of the front bearing 52 is seated in the enlarged part of the central opening in the closure plate and with the O-ring seal 55 in position. The ring block 50 is then bolted to the rear closure plate 25 and this effects the assembly of the cylinder 40 with the rear closure plate. The plate ring 42 may then be assembled on the threaded end of the piston 41 and the nut 44 threaded home. The plate ring 42 may then be seated in position within the rear end of the plunger 35 and the split lock ring 43 snapped in place. The plunger 35 may then be inserted through the openings in the seal rings 28 and 29, and the seals carried thereby, and final assembly is accomplished by bolting the rear closure plate 25 to the valve body 10.

In the disclosed embodiment, the line media is used as the operating liquid for the pilot cylinder 40. A liquid line 65 may be tapped into the valve body 10, as at 66, so as to be in constant communication with the liquid under pressure from the inlet port 19. The line 65 leads to the inlets 67,67 of a pair of solenoid valves 68,69 which may be of standard construction. The outlets 70 and 71 of the valves 68,69 are connected to the openings 60 and 59, respectively, of the pilot cylinder 40. The exhausts 72,72 of the valves 68 and 69 may be connected together and lead to a suitable drain or tank, in conventional manner.

The valve is shown in closed position in FIG. 1, since the radial ports formed by the pattern of slots 46,47 and 48, are to the right of the double acting seal carried by the seal ring 29 so that communication with the outlet opening 22 is blocked. To shift the plunger 35 to the open position shown in FIG. 2, the solenoids of the valves 68 and 69 are energized in predetermined manner to connect the pressure line 67 of valve 69 to the outlet line 71 and thus deliver line media to the rear of the piston head 56. At the same time, the line 70 of valve 68 is connected to the exhaust line 72.

As before mentioned, the valve construction shown in FIGS. 1 through 3, will insure that the plunger 35 will always return to the closed position shown in FIG. 1 in the event of loss of pilot pressure, such as may occur when the line 65 is ruptured, or for any other reason. In some cases, it is desirable that the valve plunger 35 is in open position in the event of loss of pilot pressure and, in that case, the radial ports 46, 47 and 48 are relocated, as shown at 46a, 47a and 48a in FIG. 5.

I claim:

1. A valve for controlling flow of liquid under pressure, comprising:

a valve body, having a longitudinal opening which is closed at both ends, inlet and outlet ports communicating with said body opening at longitudinally spaced places therealong, a valve plunger slidably received within said body opening and reciprocable axially thereof, said plunger being in the form of a tubular cylinder which is open at both ends and is of substantially uniform interior diameter along its entire length to provide a unobstructed opening therethrough, one open end of said valve plunger being related to said inlet port so that liquid from the latter is in constant communication with the interior of said valve plunger, a pair of seals disposed in said body opening and extending between said body and the exterior surface of said plunger, said seals being spaced apart and disposed on opposite sides of said outlet port thereby to prevent fluid flow from said inlet port to said outlet port except through said cylinder plunger, an operator extending into the opposite open end of said plunger for effecting shifting action of said valve plunger between two positions, an apertured member extending radially between said operator and the interior wall of said plunger connecting said operator with the opposite end of said valve plunger, the apertures therein permitting substantially unrestricted flow of liquid through said plunger and out said opposite end to surround the exterior of said plunger at said opposite end and thereby provide a balancing effect to minimize liquid resistance to plunger shifting action, first means detachably connecting said member to said plunger and second means detachably connecting said member to said operator to facilitate ready assembly and disassembly thereof, said plunger having radial ports in its defining wall, said radial ports cooperating with one of said seals, whereby in one position of said plunger communication between said inlet and outlet ports in blocked, and in the other plunger position communication between said inlet and outlet ports is effected.

2. The construction according to claim 1 wherein said apertured member partially but not completely closes said opposite end, to provide a piston face against which inlet liquid constantly bears to urge said plunger to one of its said positions.

3. The construction according to claim 2 wherein said plunger is urged to the position of blocking communication between said inlet and outlet ports.

4. The construction according to claim 2 wherein said plunger is urged to the position for effecting communication between said inlet and outlet ports.

5. The construction according to claim 1 wherein each of said seals is of the double acting type to seal against liquid flow in both directions along the exterior surface of said plunger.

6. The construction according to claim 5 wherein each of said seals comprises a pair of plastic fluro-carbon wear rings confining therebetween a softer elastomer seal ring,
   the inner peripheral surface of said seal ring engaging the exterior surface of said plunger for sealing action,
   and the inner peripheral surface of each wear ring engaging the exterior surface of said plunger on opposite sides of said seal ring to act as bearings for said plunger and as wipers to keep contaminants away from said seal ring.

7. The construction according to claim 1 wherein said body is a metal casting with said longitudinal opening resulting from the casting operation the ends of said opening being closed at a later stage of assembly of said valve, said body having a pair of circular lands machined on the wall surface defining said opening, each of said lands closely receiving the exterior annular surface of a metal seal ring and the latter being welded to said body in position on respective lands, said metal ring receiving said seals.

8. The construction according to claim 1 wherein said operator is a pilot cylinder connected to said valve body and adapted to effect reciprocation of said plunger,
   said pilot cylinder having a piston extending through an opening in an end closure for said body opening, said piston having an end connected to said apertured numbers.

9. The construction according to claim 8 wherein said piston is moved by inlet liquid.

10. The construction according to claim 1 wherein said apertured member is in the form of a plate ring disposed within said plunger opposite end and secured thereto, said ring having an operating rod of said operator secured centrally thereof and extending in an axial direction away from said plunger opposite end, and said ring having at least one opening transversely therethrough and of a size to provide for said unrestricted flow of liquid.

11. The construction according to claim 10 wherein said first means comprises the inner surface of said valve plunger having an annular transversely disposed shoulder inwardly of said opposite end, one side face of said plate ring seating against said shoulder, and a snap ring seated in an annular groove in the said inner surface of said valve plunger and bearing against the opposite side face of said plate ring to lock the latter to said valve plunger.

12. The construction according to claim 10 wherein said operating rod extends through an opening in a removable closure plate, the latter closing the adjacent end of said valve body opening, said operating rod having a piston at its end,
   a cylinder in which said piston is disposed for axial movement,
   a ring block having removable connection with said closure plate, said ring block being fixed to the exterior surface of said cylinder whereby it and said cylinder may be secured as a unit to said closure plate.

* * * * *